(12) United States Patent
Oriakhi

(10) Patent No.: US 7,435,367 B2
(45) Date of Patent: Oct. 14, 2008

(54) CEMENT SYSTEM INCLUDING A BINDER FOR USE IN FREEFORM FABRICATION

(75) Inventor: Christopher Oriakhi, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 588 days.

(21) Appl. No.: 11/154,366

(22) Filed: Jun. 15, 2005

(65) Prior Publication Data
US 2005/0230870 A1    Oct. 20, 2005

Related U.S. Application Data

(62) Division of application No. 10/606,881, filed on Mar. 24, 2003, now Pat. No. 6,930,144.

(51) Int. Cl.
*B29C 41/02* (2006.01)
(52) U.S. Cl. .............. 264/113; 264/122; 264/308; 425/375
(58) Field of Classification Search ............... None
See application file for complete search history.

(56) References Cited

U.S. PATENT DOCUMENTS

| | | | |
|---|---|---|---|
| 4,183,759 A | 1/1980 | Epstein | |
| 4,324,592 A | 4/1982 | Patel et al. | |
| 5,204,055 A | 4/1993 | Sachs et al. | |
| 5,340,656 A | 8/1994 | Sachs et al. | |
| 5,340,868 A | 8/1994 | Strauss et al. | |
| 5,639,402 A | 6/1997 | Barlow et al. | |
| 6,274,661 B1 | 8/2001 | Chen et al. | |
| 6,734,237 B1 | 5/2004 | Taylor et al. | |
| 7,087,109 B2 | 8/2006 | Bredt et al. | |
| 2002/0188055 A1 | 12/2002 | Chen et al. | |
| 2003/0133822 A1* | 7/2003 | Harryson | 419/35 |
| 2004/0056378 A1* | 3/2004 | Bredt et al. | 264/109 |
| 2004/0152824 A1 | 8/2004 | Dobrowolski | |

FOREIGN PATENT DOCUMENTS

| | | |
|---|---|---|
| DE | 10158233 | 11/2001 |
| EP | 0219952 A1 | 4/1987 |
| EP | 0639366 A1 | 2/1995 |
| JP | 61-270249 | 11/1986 |
| JP | 04-083748 | 3/1992 |
| JP | 6056539 | 1/1994 |
| JP | 2002-160948 | 6/2002 |
| WO | WO 0026026 | 5/2000 |
| WO | WO 01/078969 | 10/2001 |

OTHER PUBLICATIONS

"Hydration of Tetracalcium Phosphate"; Martin et al; Advances in Cement Research; 1993; 5; No. 19; pp. 119-125.
Hydrolysis of Tetracalcium Phosphate in the Presence of a Poly (alkenoic acid); Greish et al; J. Mater. Research; vol. 14; No. 12; Dec. 1999; pp. 4637-4642.
"Nonresorbable Bone Implants via LOM"; Rapid Prototype Development Laboratory -1996-1998; http://www.udri.udayton.edu/rpdl/bone.htm; May 29, 2003; 2 pages.
EP Search Report; Oct. 24, 2007; 3 pages.

* cited by examiner

*Primary Examiner*—Mary Lynn F Theisen

(57) ABSTRACT

A cement system for use in freeform fabrication includes a binder composition, which comprises an organic acid and/or an inorganic acid including a phosphate ion, a polyacid, and a primarily aqueous solvent.

32 Claims, 1 Drawing Sheet

CEMENT SYSTEM INCLUDING A BINDER FOR USE IN FREEFORM FABRICATION

This is a division of application Ser. No. 10/606,881 filed Mar. 24, 2003 now U.S. Pat. No. 6,930,144.

BACKGROUND

Freeform fabrication is fast becoming a popular process for manufacturing three-dimensional objects including finished products, prototype parts or models, and working tools. For example, freeform fabrication is used to make products such as structural ceramics and ceramic shell molds. Several methods of freeform fabrication involve a process of sequentially forming layers of the desired end product.

When freeform fabrication involves a process of sequentially forming layers, a number of planar layers are combined together to form a planar or non-planar, three-dimensional object. The object is formed layer-by-layer, with a segment of each layer representing a cross section of the final desired product. Adjacently formed layers are adhered to one another in predetermined patterns to build up the desired product.

In some methods, a layer of the desired product is formed by spreading a layer of powdered build material and then selectively injecting a binder into the powder. Where applied, the binder binds the powder into a cross section of the desired product. In other methods, the build material is selectively ejected to form each sequential layer of the desired product.

There are several disadvantages, however, in conventional freeform fabrication processes, including the fragility of the resulting product. Poor mechanical properties in the final product are a result of a low compression modulus. Poor mechanical properties are also manifested by fragility in extension, or low fracture strength.

SUMMARY

A cement for use in freeform fabrication includes a binder composition, which comprises an organic acid and/or an inorganic acid including a phosphate ion, a polyacid, and a primarily aqueous solvent.

A method for forming a three-dimensional object includes the steps of iteratively infiltrating individual layers of powder including a polymer and at least one inorganic phosphate, with a primarily aqueous binder composition including a polyacid which reacts at least with the inorganic phosphate reagents and reaction products. The binder further includes an organic acid and/or an inorganic acid including a phosphate ion. The infiltrated powder layers are formed adjacent to one another to form said three-dimensional printed object.

A freeform fabrication apparatus includes a liquid ejection head and a liquid binder composition, including, an organic acid and/or an inorganic acid including a phosphate ion, a polyacid and a primarily aqueous solvent.

BRIEF DESCRIPTION OF THE DRAWING

The FIGURE illustrates a typical freeform fabrication system in which embodiments of the present invention can be used. The illustration is merely by way of example and does not limit the scope of the invention.

DETAILED DESCRIPTION

Figure 1:
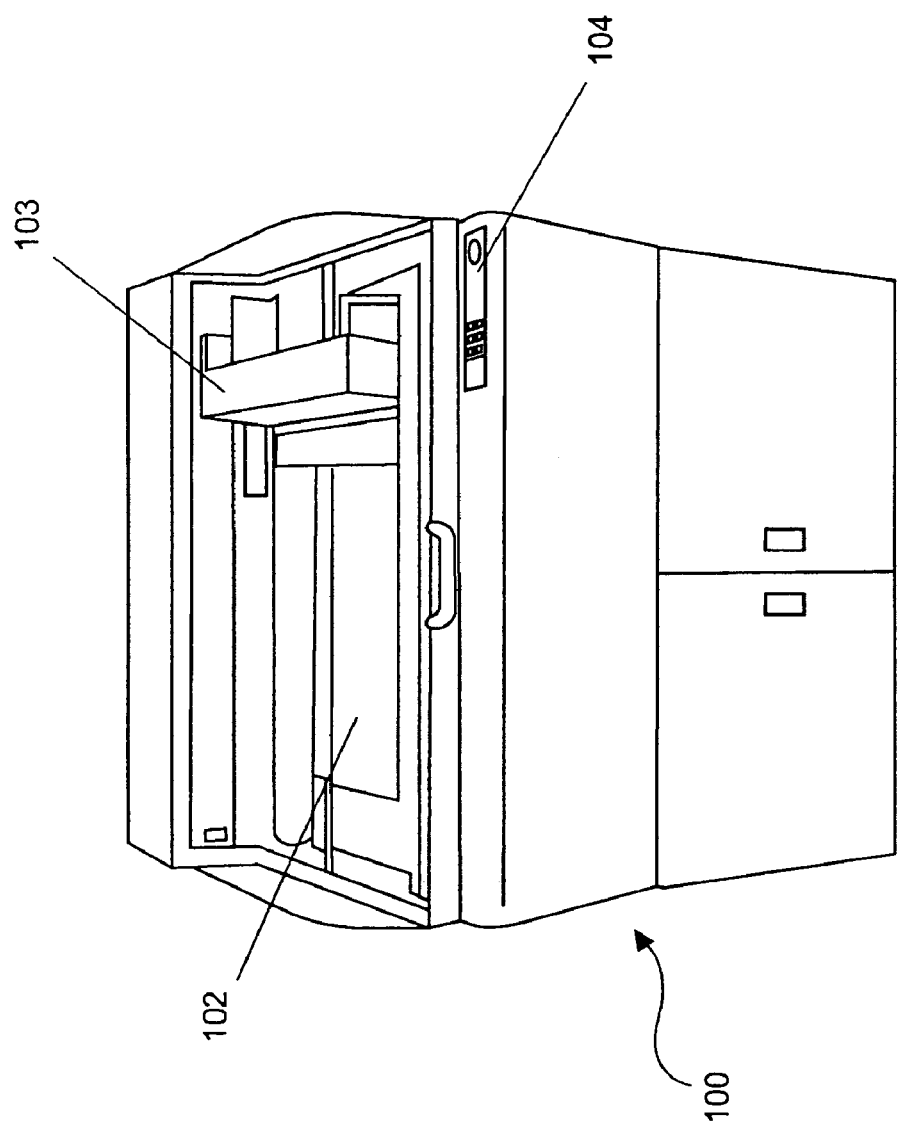

In some freeform fabrication systems, a powdery material is used to form each individual layer of the desired product. As shown in the FIGURE, a freeform fabrication unit (100) includes a supply of powdered build material. A measured quantity of the powder is dispensed from a supply chamber. A roller on a moving stage (103) distributes and compresses the powder at the top of a fabrication chamber (102). Then, a multi-channel liquid ejection head, which may be based on inkjet printing technology or drop-on-demand technology, deposits adhesive or binder onto the powder in the fabrication chamber (102) in a two dimensional pattern. The jetting head may also be disposed on the moving stage (103). This two dimensional pattern is a cross section of the desired product. This jetting head may also eject colorant or toner to provide a desired color or color pattern for that particular cross section of the desired product.

The powder becomes bonded in the areas where the adhesive is deposited, thereby forming a layer of the desired product. The process is repeated with a new layer of powder being applied over the top of the previous layer. The next cross section of the desired product is then formed into the new powder layer. The adhesive also serves to bind the adjacent layers of the desired product together.

This process continues until the entire object is formed within the powder bed in the fabrication chamber (102). The extra powder that is not bonded by the adhesive is then brushed away, leaving the base or "green" object. A user interface (104) allows a user to initiate and control the fabrication process.

Such a process offers the advantages of speedy fabrication and low materials cost. It is considered one of the fastest freeform fabrication methods, and can produce products in a variety of colors.

However, as noted above, there are several disadvantages in conventional powder-based freeform fabrication processes, including the fragility of the resulting product. Weakness in compression modulus and tensile failures at low stress may be due to low particle density, poor adhesion between powder particles, and the presence of voids in the final product. In both the intralayer and interlayer levels, the powder particles are only loosely glued together. Powders that are presently being used in the market are based on filler inorganic particles such as gypsum and/or plaster of Paris, etc., together with water swellable polymers such as starches, poly (vinyl alcohol), etc. and mixtures of these water swellable polymers.

When these types of systems are used, the powder surface is printed with an aqueous binder, and the polymer particles swell due to absorption of the aqueous binder. Adhesion is the result of the swelling of the polymer particles. Interaction of these powders with an aqueous binder results in poor mechanical strength as well as high porosity of the green object.

Also, parts made by powder-based freeform fabrication as well as jetted polymer, direct build-up type freeform fabrication suffer from poor strength. The latter is due to the fact that only lower molecular weight polymers can be jetted since high molecular weight polymers have viscosities that are too high.

Further, the swelling process for the binding polymers of the above method tends to take place very slowly. The interaction between water and plaster of Paris also occurs very slowly. For these reasons, the conventional process requires more than an hour for the reacted materials to set and for the fabricated product to be removed from the powder bed.

Another problem that is directly associated with conventional powder-based freeform fabrication is the high density of the final product. The starting materials in the powder have such a high density that the final product produced by the conventional process typically has a density that is greater than 1 g/cm³. The high density of the product is a serious nuisance, particularly when 1:1 scale models of large objects are being produced.

Further, the poor mechanical properties in the resulting product are related to the fact that the green object, which is fabricated by producing layers in a powder bed, must be subjected to labor intensive post-processing. This post-processing often involves soaking the surface of the printed object with reinforcing agents such as cyanoacrylate glue, etc. Gypsum based powders and water swellable polymers currently available require long swelling times, which can be thirty minutes or more. Another disadvantage of this and similar processes is that the resulting products can have a poor resolution, represented by a grainy texture of the product.

As mentioned above, the currently available processes for freeform fabrication use loosely bound polymer and inorganic particles to produce a product that has poor mechanical properties and a grainy texture. While post-processing drying of the resulting article improves the mechanical properties slightly, the improvements are minimal and the drying process is very slow. Other post-processing measures include reinforcing with polymerizable glues such as cyanoacrylate, or surface finishing, but these measures are costly and labor intensive. Ultimately the mechanical properties and surface finish depend on the properties of the system of materials in concert with their ability to intermix uniformly and react sufficiently.

The present specification described binders and cements that can be used in freeform fabrication processes. More particularly, the present specification describes binders that are combined with calcium phosphate-based cements for freeform fabrication of three-dimensional objects that are less fragile and require less post-fabrication processing than previous systems.

As used herein and in the appended claims, the term "binder" is defined to mean a liquid substance, with or without toner, ink, dye, pigment, color or colorant, that is injected into a powdered build material, such as a calcium phosphate cement, to selectively bind and/or color the powdered build material into a layer of an object being created through a freeform fabrication process. Consequently, "binder" means, but is not limited to, ink, toner, dye, pigment, colorant, binder, adhesive or any combination thereof.

Calcium phosphate cement compositions are conventionally useful for several technologies apart from freeform fabrication. For example, hydraulic calcium phosphate cement compositions are used as repair materials for teeth and bones because the calcium phosphate cement composition can be converted into compounds resembling the primary ingredients of teeth and bones. The cement compositions are also used as absorbing agents for living tissue polymers, organic substances or inorganic ions that are harmful to the living body.

The conventional calcium phosphate cement compositions are not useful in freeform fabrication systems, however. Typically, the calcium phosphate cement compositions are extremely dense, and are nearly neutral in terms of their pH values so as to be suitable for use in the acidic environment of a living body and also strong enough to withstand the high impact environments in which bones, teeth, and the tissues of living bodies exist.

The present specification describes a calcium phosphate cement composition that is adapted for use in freeform fabrication systems. The new cement composition is separable into two parts prior to reacting and setting, namely, a powder component and a liquid binder component. The binder is compatible with inkjet systems such as, in a non-limiting example, drop-on-demand systems and can be used in freeform fabrication systems that incorporate an inkjet print head in, for example, drop-on-demand technology. The composition improves on known deficiencies in the final product of a freeform fabrication system including such problems as brittleness, fragility, high density, and the need for expensive and time-consuming post-production processing.

The calcium phosphate cement system, including binder and powder, for use in freeform fabrication according to the method described herein is based on chemical reactions involving calcium phosphate compounds as reagents, which react to form hydroxyapatite, $Ca_5(PO_4)_3OH$ or $Ca_{10}(PO_4)_6(OH)_2$. Examples of such reactions are shown in reactions (1) through (4).

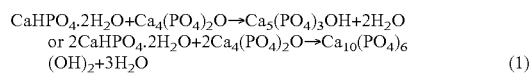

$$CaHPO_4 \cdot 2H_2O + Ca_4(PO_4)_2O \rightarrow Ca_5(PO_4)_3OH + 2H_2O$$
or $2CaHPO_4 \cdot 2H_2O + 2Ca_4(PO_4)_2O \rightarrow Ca_{10}(PO_4)_6(OH)_2 + 3H_2O$ \hfill (1)

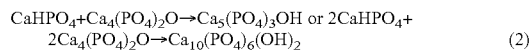

$$CaHPO_4 + Ca_4(PO_4)_2O \rightarrow Ca_5(PO_4)_3OH \text{ or } 2CaHPO_4 + 2Ca_4(PO_4)_2O \rightarrow Ca_{10}(PO_4)_6(OH)_2$$ \hfill (2)

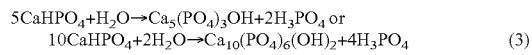

$$5CaHPO_4 + H_2O \rightarrow Ca_5(PO_4)_3OH + 2H_3PO_4 \text{ or } 10CaHPO_4 + 2H_2O \rightarrow Ca_{10}(PO_4)_6(OH)_2 + 4H_3PO_4$$ \hfill (3)

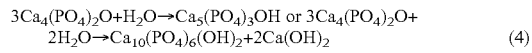

$$3Ca_4(PO_4)_2O + H_2O \rightarrow Ca_5(PO_4)_3OH \text{ or } 3Ca_4(PO_4)_2O + 2H_2O \rightarrow Ca_{10}(PO_4)_6(OH)_2 + 2Ca(OH)_2$$ \hfill (4)

A powder composition including calcium phosphate-based reagents for freeform fabrication can include the above reagents, or other mixtures of mono-, di-, tri-, tetra-, penta- and octa-calcium phosphate as reagents for the production of hydroxyapatite. Therefore, the above reactions are only examples of numerous reactions that can take place to produce a calcium phosphate cement-based product through the freeform fabrication techniques described.

As mentioned above, the powder composition is used to form each individual layer of a desired three-dimensional product. First, a measured quantity of powder is dispensed from a supply chamber in a freeform fabrication apparatus such as that illustrated in the FIGURE. A roller or other distribution and compression apparatus then distributes and compresses the powder at the top of a fabrication chamber to form a very thin, uniform powdery film. Then, a liquid ejection head deposits a binder composition onto the powdery film in the fabrication chamber in a two dimensional pattern. This two dimensional pattern is a cross section of the final, three-dimensional product.

The powder includes, in addition to the inorganic phosphate reagents discussed above, a polymer such as an aliphatic polymer and organic acid compounds. The aliphatic polymer is preferably a vinyl polymer. The powder may also include one or more nanofillers which swell when contacted with the aqueous binder composition. The nanofillers can be organic, inorganic, or hybrids of organic and inorganic compounds. As an example, a synthetic or natural composition including clay minerals and/or layered double hydroxide and/or hydrotalcite will swell in the presence of water or an aqueous composition such as the binder composition described herein. By way of example, the nanofiller can be clay minerals, layered double hydroxide, hydrotalcite, alumina, silica, and preformed polymer-layered inorganic nanocomposite.

Because the nanofiller composition swells, spaces are provided between the reactive cement powder materials such as the inorganic phosphates, their reaction products, and the polymers mixed therewith. These spaces allow for an interpenetrating network of polymers from the powder composition and the binder composition to be built throughout and between the layers of the final three-dimensional calcium phosphate cement product that is built by the freeform fabrication unit. The interpenetrating network is formed by reactions between the inorganic phosphate reagents, their reaction products including hydroxyapatite, and the various polymers and acids from the powder composition and the binder composition described herein.

In addition, the powder can include reaction accelerators. Examples of reaction accelerators include small metal salts such as magnesium fluoride or lithium phosphate. The additives discussed above, including the polymers, organic acids, and nanofillers inherently provide improved physical properties in the calcium phosphate cement product, directed to mechanical strength and surface texture.

The reactions that form the calcium phosphate cement product are not limited to any particular setting mechanism, and vary depending on the polymers and acids used in the powder and binder compositions. For example, acid-base and/or hydrolysis reactions are typically a part of the setting mechanism. The binder composition is aqueous, as will be discussed further below. Also, when a water soluble polymer additive is added to either the powder or the binder composition as a bulking agent, the setting mechanism further involves a gelation process. As mentioned above, complexation and cross-linking occurs between a polyacid or other organic acids such as phytic acid or citric acid in the binder composition, and the inorganic phosphate reagents and their reaction products from the powder composition. In a preferred embodiment, the polyacid is comprised, at least in part, of (meth)acrylic monomers. Further, precipitation reactions can occur among the reagents of the powder and binder compositions used in the freeform fabrication process, thereby forming the calcium phosphate cement including the interpenetrating network.

The binder composition described herein serves as a vehicle for the various components within the binder composition itself, and is specifically tailored for use with an inkjet or drop-on-demand liquid ejection system, such as a thermal inkjet printhead. As discussed above, the binder composition contributes to the setting mechanism by way of its components. Further, the products produced using the binder composition are stronger than products produced by conventionally known calcium phosphate cements such as those used for dental and medical applications.

The binder composition described herein is acidic, most preferably in the range of about pH 2.5 to 5.5. One or more acids can be used, and examples include phosphoric acid, acid salts such as ammonium dihydrogen phosphate and ammonium hydrogen phosphate, phytic acid, citric acid, malonic acid, maleic acid, itaconic acid, vinyl phosphoric acid, tartaric acid, and pyruvic acid. Further, a polyacid is used as a component of the binder composition. The polyacid is preferably a polymer at least partially based on acrylic monomer units, and is most preferably one or more polymers selected from poly(acrylic acid), poly(vinyl phosphoric acid), poly (metha)acrylic acid, and poly(metha)acrylic acid copolymers and other vinyl copolymers, as well as synthetic polymers such as polylactic acid and polyglycolic acid.

The binder composition preferably includes an anti-crusting component such as 2-pyrrolidone, 1,5-pentanediol, and one or more surfactants and/or humectants. Various dyes that are soluble in the binder composition and/or pigments that are suspended in the binder composition are present in the binder composition as well.

The binder composition is primarily water, although other alcohols are also included as solvents. In a preferred embodiment of the invention, the binder composition is about 70% to about 90% water. Also, in a preferred embodiment, when alcohol is included in the binder composition, it is present from about 0.5 wt % to about 13.0 wt %.

Exemplary binder compositions of the present invention were manufactured and found to work very well with calcium phosphate cements. The components are listed according to their various weight percentages in the following Table.

| Composition | Example 1 | Example 2 | Example 3 | Example 4 | Example 5 |
|---|---|---|---|---|---|
| 2-Pyrrolidone | 3 | 5 | 2 | 3 | 3 |
| Liponics EG-1 (Ethoxylated glycerol) | 5 | 3.5 | 2 | 5 | 5 |
| 1,5-Pentanediol | 5.5 | 5 | 0 | 3.5 | 3.5 |
| Phytic acid | 3 | 0 | 0 | 3 | 3 |
| Citric acid | 2 | 2 | 0 | 0 | 0 |
| Surfynol 465 | 0.75 | 1 | 1 | 0.75 | 0.75 |
| Tergitol 15-S-5/7 | 1 | 1 | | 1 | 1 |
| $H_3PO_4$ | 0 | 5 | 10 | 0 | 2 |
| $NH_4H_2PO_4$ | 0 | 0 | 10 | 0 | 0 |
| Poly(vinyl phosphoric acid) (MW < 20,000) | 0 | 0 | 0 | 3 | 0 |
| Poly(acrylic acid) (MW < 20,000) | 0 | 0 | 0 | 0 | 3 |
| Magenta M377-Na | 2 | 0 | | 2 | 0 |
| Direct Blue 199-Na | 0 | 3 | | 0 | 3 |
| Direct Yellow 132-Na | 0 | 0 | 3 | 0 | 0 |
| Balanced water | 77.75 | 74.5 | 72 | 78.75 | 75.75 |

Solid compression bars fabricated from calcium phosphate/polymer nanocomposite cements by use of the binder described herein were produced and tested. The compression bars fabricated from the cement exhibited fast setting kinetics, and excellent mechanical properties as well as surface finish.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method for freeform fabrication of a three-dimensional object, which comprises:
   iteratively infiltrating individual layers of powder including a polymer and at least one inorganic phosphate, with a primarily aqueous binder composition comprising a polyacid which reacts at least with said inorganic phosphate, and further comprising an organic acid and/or an inorganic acid including a phosphate ion,
   wherein the infiltrated powder layers are formed adjacent to one another to form said three-dimensional object.

2. A method according to claim 1, wherein the primarily aqueous binder composition further comprises a colorant.

3. A method according to claim 1, wherein said at least one inorganic phosphate comprises one or more compounds selected from the group consisting of monocalcium phosphate, dicalcium phosphate, tricalcium phosphate, and tetracalcium phosphate.

4. A method according to claim 1, wherein said polymer is one or more aliphatic hydrocarbons.

5. A method according to claim 1, wherein said polymer is one or more vinyl polymers.

6. A method according to claim 1, wherein said powder further comprises a nanofiller which swells when contacted with water from said aqueous binder composition.

7. A method according to claim 6, wherein said nanofiller is selected from the group consisting of clay minerals, layered double hydroxide, hydrotalcite, alumina, silica, and preformed polymer-layered inorganic nanocomposite.

8. A method according to claim 1, wherein about 70 wt. % to about 90 wt. % of said binder composition is water.

9. A method according to claim 1, wherein said organic acid in said binder composition comprises at least one compound comprising a phosphate ion.

10. A method according to claim 1, wherein said organic acid in said binder composition comprises citric acid.

11. A method according to claim 1, wherein said organic acid in said binder composition comprises phytic acid.

12. A method according to claim 2, wherein said colorant comprises a pigment suspended as particles in said composition and a dye dissolved in said composition.

13. A method according to claim 1, wherein said binder composition has a pH ranging from about 2.5 to about 5.5.

14. A method according to claim 1, wherein said binder composition further comprises at least one alcohol.

15. A method according to claim 14, wherein a total alcohol content ranges from about 0.5 wt. % to about 13.0 wt. %.

16. A method according to claim 1, wherein said polyacid in said binder composition is composed, at least in part, of (meth)acrylic monomers.

17. A method according to claim 1, wherein said binder composition further comprises at least one surfactant and/or at least one humectant.

18. A freeform fabrication apparatus, which comprises:
a liquid ejection head; and
a liquid binder composition, including,
an organic acid and/or an inorganic acid including a phosphate ion;
a polyacid; and
a primarily aqueous solvent.

19. A freeform fabrication apparatus according to claim 18, wherein said binder composition further comprises a colorant.

20. A freeform fabrication apparatus according to claim 18, wherein said liquid ejection head comprises an inkjet printhead.

21. A freeform fabrication apparatus according to claim 18, wherein said inkjet printhead is a thermal inkjet printhead.

22. A freeform fabrication apparatus according to claim 18, wherein said inkjet printhead is a piezoelectric inkjet printhead.

23. A freeform fabrication apparatus according to claim 18, wherein about 70 wt. % to about 90 wt. % of said binder composition is water.

24. A freeform fabrication apparatus according to claim 18, wherein said organic acid comprises at least one compound comprising a phosphate ion.

25. A freeform fabrication apparatus according to claim 18, wherein said organic acid comprises citric acid.

26. A freeform fabrication apparatus according to claim 18, wherein said organic acid comprises phytic acid.

27. A freeform fabrication apparatus according to claim 19, wherein said colorant comprises a pigment suspended as particles in said composition, and a dye dissolved in said composition.

28. A freeform fabrication apparatus according to claim 18, wherein said binder composition has a pH ranging from about 2.5 to about 5.5.

29. A freeform fabrication apparatus according to claim 18, wherein said binder composition further comprises at least one alcohol.

30. A freeform fabrication apparatus according to claim 29, wherein said alcohol is present ranging from about 0.5 wt. % to about 13.0 wt. %.

31. A freeform fabrication apparatus according to claim 18, wherein said polyacid is composed, at least in part, of (meth)acrylic monomers.

32. A freeform fabrication apparatus according to claim 18, wherein said binder composition further comprises at least one surfactant and/or at least one humectant.

* * * * *